Patented June 13, 1933

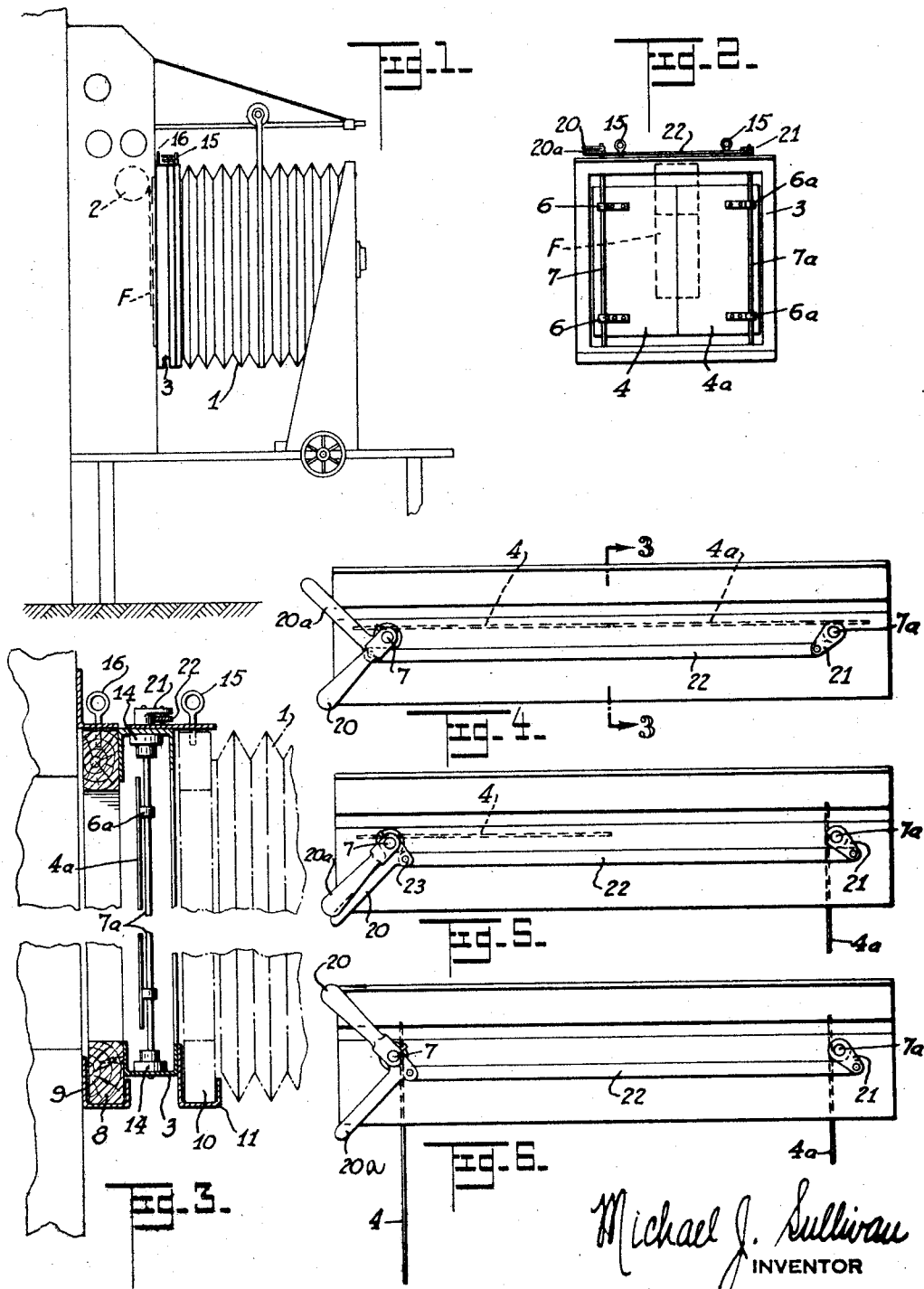

1,913,998

UNITED STATES PATENT OFFICE

MICHAEL J. SULLIVAN, OF BROOKLYN, NEW YORK, ASSIGNOR TO STAR COMPANY, OF NEW YORK, N. Y., A CORPORATION OF NEW YORK

CAMERA

Application filed November 13, 1931. Serial No. 574,700.

My invention relates to a new and improved camera.

One of the objects of my invention is to improve the commercial type of camera which is used for professional purposes, as for example by newspapers and the like.

Another object of my invention is to improve a camera of this type so as to minimize or prevent the waste of film.

Another object of my invention is to provide one or more shutters for preventing exposure of a specified portion or portions of the film portion which is in the exposure aperture.

Another object of my invention is to provide a plurality of shutters so as to control the area of exposure of the strip of film which is in the exposure aperture.

Another object of my invention is to provide a device of this type which can be made in the form of a simple attachment, so that this attachment can be readily applied to the present commercial type of camera.

Other objects of my invention will be set forth in the following description and drawing which illustrates a preferred embodiment of my invention, it being understood that the above general statement of the objects of my invention is intended merely to generally explain the same and not to limit it in any manner.

Fig. 1 is a side elevation.

Fig. 2 is a front elevation showing the shutters and the appurtenant parts.

Fig. 3 is a sectional view on the line 3—3 of Fig. 4.

Fig. 4 is a top plan view showing both shutters in the operative position.

Fig. 5 is a view similar to Fig. 4 showing one of the shutters in the inoperative position.

Fig. 6 is a view similar to Fig. 4 showing both shutters in the inoperative position.

Heretofore cameras of the commercial type used by newspapers and the like have been constructed in the ordinary manner, so that a predetermined length of the film had its entire area exposed.

This has often resulted in a waste of film because the desired picture could frequently be taken upon a portion of the film which was located in the exposure aperture.

According to my invention, the exposed strip of film is protected by one or more shutters so that a plurality of exposures can be taken upon different areas of the strip of film in the exposure aperture.

After the strip of film in the exposure aperture has been completely exposed so as to take a plurality of pictures, said strip of film is cut off and developed in the usual manner.

In this embodiment I have shown the use of a pair of shutters, but I do not wish to be limited to the use of any particular number of said shutters.

The camera is constructed in the usual manner with a bellows member 1 and a roller 2 upon which the roll of film F is mounted in the usual manner. In this type of camera, the roll of film is fed downwardly from the roller 2 until a strip of said film is located in the exposure area, said strip being indicated in Fig. 2. When the strip of film is exposed. it is cut off and allowed to drop into a developing room. Since these details are well known per se, they are illustrated in a diagrammatic manner.

As shown in Fig. 3, a metal frame 9 is suitably secured to the casing of the camera and a frame member 8 is suitably held in the frame 9 by means of a fastening device 16. The shutter casing 3 is made of metal and it is connected to the wooden frame member 8 by any suitably fastening device. A supplemental metal frame 11 is connected to the shutter casing 3 in any suitable manner, as by riveting, soldering, or the like, and the bellows member 1 is connected to a frame member 10 (preferably made of wood) which is held in position in the frame 11, by means of a fastening device 15. The effect is to locate the shutter casing and the shutter members located therein, at the rear of the bellows member 1.

Vertical shafts 7 and 7a are mounted in bearings 14 provided in the shutter casing 3. These shafts 7 and 7a project above the top of the shutter casing 3. Shutters 4 and 4a which are made of metal or any other suitable material are connected to said shafts 7 and 7a, by means of collars 6 and 6a.

As shown in Fig. 2, said collars have shanks which are connected to the shutters 4 and 4a. The shutters 4 and 4a therefore turn in unison with their respective shafts 7 and 7a.

As shown in Fig. 4, a handle 20 is connected to the upwardly projecting end of the shaft 7, so that the handle 20 and the shaft 7 turn in unison. Hence, when the handle 20 is turned from the position shown in Fig. 4 to the position shown in Fig. 6, the shutter 4 is turned from the operative position shown in Fig. 4, to the inoperative position shown in Fig. 6. When the shutter 4 is in the operative position shown in Fig. 4, it covers one-half of that portion of the film F which is in the exposure aperture.

An arm 21 is rigidly connected to the shaft 7a, so that said arm 21 and the shaft 7a turn in unison. The arm or lug 21 is pivotally connected to a link 22 and this is pivotally connected at 23 to a handle 20a which is turnably mounted upon the upward projection of the shaft 7. Hence, the arm 20 can turn with respect to the shaft 7. When the arm 20a is turned from the position shown in Fig. 4 to the position shown in Fig. 5, the shutter 4a is turned from the operative position to the inoperative position.

Hence, if it is desired to use one-half of the strip of film which is in the exposure aperture, it is only necessary to turn either the shutter 4 or the shutter 4a to the inoperative position. The shutter which has thus been turned is moved back to the operative position, and the remaining part of the film in the exposure area can then be exposed by manipulating the other shutter.

This simple device therefore makes it possible to produce a marked economy in film, because many pictures can be taken without using the entire area of film which is located in the exposure aperture.

It will be noted that the manipulating handles 20 and 21 are directly adjacent each other, so that the shutters can be conveniently manipulated. Referring to Fig. 2, it can be seen that the shafts 7 and 7a are spaced from each other and that each said shaft is spaced from the edge of the exposure aperture in which there is located the part of the film F which is to be exposed. Hence, the area of the shutters 4 and 4a greatly exceeds the area of the exposure aperture, and said shutters extend above and below said exposure aperture.

I have shown a preferred embodiment of my invention, but it is clear that numerous changes and omissions can be made without departing from its spirit.

I claim:

1. A camera having an exposure aperture and a bellows member, a shutter casing located between said exposure aperture and the rear end of said bellows member, a first shaft and a second shaft located in said shutter casing, a first shutter connected to said first shaft and a second shutter connected to said second shaft, said shutters being turnable in unison with their respective shafts, said shafts projecting out of said shutter casing, a first handle located exterior to said casing and connected to the projecting end of the first shaft, a second handle located exterior to said casing and turnably mounted upon the projecting end of said first shaft, an arm located exterior to said casing and connected to the second shaft, and a link pivotally connected to said arm and to the second handle.

2. A camera having a casing, said casing having an exposure aperture through which a film may be led, a frame connected to the wall of said casing and around said aperture, a bellows member connected to said frame, spaced shafts connected to said frame intermediate the front and rear ends of said frame, shutters carried by said shafts and adapted to overlie the film, each said shaft being spaced from the corresponding edge of said aperture so that the total area of said shutters exceeds the total area of said aperture.

In testimony whereof I affix my signature.

MICHAEL J. SULLIVAN.